US012683501B2

(12) United States Patent
Shukla et al.

(10) Patent No.: US 12,683,501 B2
(45) Date of Patent: Jul. 14, 2026

(54) SWITCHING CONVERTER SYSTEM

(71) Applicant: Cirrus Logic International Semiconductor Ltd., Edinburgh (GB)

(72) Inventors: Hemant Shukla, Edinburgh (GB); Ross C. Morgan, Bathgate (GB); Malcolm Blyth, Edinburgh (GB); Beata K Kubiak, Falkirk (GB); Sven Soell, Edinburgh (GB); Angus Black, Largs (GB); John L. Melanson, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 117 days.

(21) Appl. No.: 18/597,295

(22) Filed: Mar. 6, 2024

(65) Prior Publication Data

US 2025/0286459 A1     Sep. 11, 2025

(51) Int. Cl.
H02M 3/158 (2006.01)
H02M 1/00 (2006.01)

(52) U.S. Cl.
CPC ....... H02M 3/1584 (2013.01); H02M 1/0009 (2021.05)

(58) Field of Classification Search
CPC .... H02M 3/1582; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/0095; H02M 1/08; H02M 1/088; H02M 3/1588; H02M 7/5395; H02M 1/14; H02M 1/0043; H02M 1/0074; H02M 1/0077; H02M 1/0045; H02M 1/0006;
(Continued)

(56) References Cited

U.S. PATENT DOCUMENTS 7,282,898 B2 * 10/2007 Condito .............. H02M 3/1584
                                                       323/272
9,425,680 B2 * 8/2016 Chen ........................ H02M 1/14
(Continued)

OTHER PUBLICATIONS

International Search Report and Written Opinion of the International Searching Authority, International Application No. PCT/EP2024/085432, mailed Mar. 13, 2025.

*Primary Examiner* — Jeffrey A Gblende
(74) *Attorney, Agent, or Firm* — Jackson Walker L.L.P.

(57) ABSTRACT

A switching converter system comprising a first converter phase and a second converter phase, the switching converter system being operable in: a power conversion mode in which the first and second converter phases are operative to generate a multi-phase output voltage at an output of the switching converter circuit; and a calibration mode in which the first converter phase is operative as a reference supply for the second converter phase to cause a flow of current between the first and second converter phases to enable detection of a characteristic of each of the first and second converter phases.

23 Claims, 3 Drawing Sheets

(58) Field of Classification Search

CPC .... H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 1/346; H02M 2003/1566; H02M 2003/1557; H02M 1/0032; H02M 1/4225; H02M 1/0025; H02M 1/0048; H02J 3/46; H02J 3/38; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069

See application file for complete search history.

(56) References Cited

U.S. PATENT DOCUMENTS

| | | | | |
|---|---|---|---|---|
| 10,348,185 | B1 * | 7/2019 | Michal | H02M 3/33507 |
| 12,451,899 | B2 * | 10/2025 | Hsu | H03K 7/08 |
| 2010/0244803 | A1 | 9/2010 | Bernacchia et al. | |
| 2014/0232420 | A1 | 8/2014 | Luo et al. | |
| 2016/0111957 | A1 | 4/2016 | Mathew et al. | |
| 2017/0063239 | A1 * | 3/2017 | Wu | H02M 3/1584 |

* cited by examiner

SWITCHING CONVERTER SYSTEM

FIELD OF THE INVENTION

The present disclosure relates to calibration of power converter circuitry.

BACKGROUND

Power converters such as inductive boost converters typically include circuitry for sensing or monitoring a current through an energy storing circuit element (e.g. an inductor) of the power converter in one or more operational phases of the power converter.

One approach to sensing or monitoring such a current is to measure a voltage across an in-line current sense resistor (i.e. a resistor that is connected in series with the circuit element of interest). However, the use of such a current sense resistor can result in reduced efficiency, due to the power dissipated as heat by the current sense resistor.

SUMMARY

According to a first aspect, the invention provides a switching converter system comprising a first converter phase and a second converter phase, the switching converter system being operable in: a power conversion mode in which the first and second converter phases are operative to generate a multi-phase output voltage at an output of the switching converter circuit; and a calibration mode in which the first converter phase is operative as a reference supply for the second converter phase to cause a flow of current between the first and second converter phases to enable detection of a characteristic of each of the first and second converter phases.

The switching converter system may further comprise calibration control circuitry. In operation of the switching converter system in the calibration mode, the calibration control circuitry may be operative to: monitor current values of the first and second converter phases while applying a predefined adjustment to a parameter of the first converter phase; and detect the characteristic of each of the first and second converter phases based on the monitored current values and the predefined adjustment.

In operation of the switching converter system in the calibration mode, the calibration control circuitry may be further operative to: compare the detected characteristics of the first and second converter phases to respective predefined characteristics for the first and second converter phases; and apply a correction to the detected characteristic of the first and/or second converter phase if the detected characteristic does not correspond to the respective predefined characteristic.

In operation of the switching converter system in the calibration mode, an offset may be applied to a duty cycle of each of the first and second switching converter phases.

The offset may be applied to the duty cycle of each of the first and second switching converter phases as a result of the application of the predefined adjustment to the parameter of the first converter phase.

The current values of the first and second converter phases may comprise target current values of the first and second converter phases.

Applying the predefined adjustment to the parameter of the first converter phase may comprise applying a predefined gain adjustment to the first converter phase.

The first converter phase may comprise a first current sense path. The second converter phase may comprise a second current sense path. Applying a predefined adjustment to a parameter of the first converter phase may comprise applying a predefined gain adjustment to the first current sense path.

The first converter phase may comprise a first current sense path. The second converter phase may comprise a second current sense path. Applying a correction to the detected characteristic of the first and/or second converter phase if the detected characteristic does not correspond to the respective predefined characteristic may comprise applying a correction gain to the first and/or second current sense path.

The first current sense path may comprise a first replica current sense path and the second current sense path may comprise a second replica current sense path.

The first replica current sense path may comprise: a replica device coupled to a switch of the first converter phase and configured to output a replica current indicative of a current through the switch; an amplifier for converting the replica current into a voltage; and a controllable gain stage for applying the correction gain.

The second replica current sense path may comprise: a replica device coupled to a switch of the second converter phase and configured to output a replica current indicative of a current through the switch; an amplifier for converting the replica current into a voltage; and a controllable gain stage for applying the correction gain.

The first converter phase may comprise a first control loop operative to generate the target current value of the first converter phase. The second converter phase may comprise a second control loop operative to generate the target current value of the second converter phase.

The first and second control loops may each comprise: a subtractor for generating a difference signal indicative of a difference between a sensed current through a switch of the respective first or second converter phase and a target current for the respective converter phase; a proportional-integral (PI) controller for generating a proportional-integral (PI) control signal phase on the difference signal; a multiplier for applying a signal indicative of a target output voltage for the respective converter phase to the PI control signal to modify the PI control signal based on the target output voltage.

The first and second converter phases may each comprise: a pulse-width modulator configured to generate a pulse-width modulated (PWM) control signal based on the modified PI control signal; and pre-driver circuitry configured to generate switch control signals for the switch of the respective first or second converter phase based on the PWM control signal.

The switching converter system may further comprise output voltage monitor circuitry configured for supplying a signal indicative of an output voltage of the first converter phase to the calibration control circuitry.

The calibration control circuitry may be operative to determine when an output voltage of the first converter phase has settled based on the signal indicative of the output voltage of the first converter phase, and to apply the predefined adjustment in response to a determination that the output voltage of the first converter phase has settled.

The first and second converter phases may be implemented in an integrated circuit.

The first converter phase may be implemented in a first integrated circuit and the second converter phase may be implemented in a second integrated circuit.

The first and second converter phases may each comprise boost converter circuitry, buck converter circuitry or buck-boost converter circuitry.

According to a second aspect, the invention provides a system comprising: first switching power converter circuitry having a first current sense path; second switching power converter circuitry having a second current sense path; and calibration control circuitry, wherein the system is operable in a calibration mode in which the first switching power converter circuitry is coupled to the second switching power converter circuitry to supply a current to the second switching power converter circuitry, wherein in operation of the system in the calibration mode, the first power converter is operated in a voltage regulation mode to output a target output voltage, and the calibration control circuitry is operative to: determine a first value of a first target current for the first switching power converter circuitry generated by a control loop of the first switching power converter circuitry; apply a predefined first value of a second target current for the second switching power converter circuitry to the second switching power converter circuitry; apply a predetermined gain adjustment to the first current sense path; determine a second value of the first target current generated by the control loop of the first switching power converter circuitry in response to the gain adjustment; determine a second value of the second target current generated by a control loop of the second switching power converter circuitry in response to the gain adjustment; based on the first and second values of the first target current and the first and second values of the second target current, calculate a gain of the first current sense path and a gain of the second current sense path; and responsive to a determination that the calculated gain of the first or second current sense path is not equal to a predefined gain, apply a correction gain to the relevant one of the first or second current sense paths.

According to a third aspect the invention provides an integrated circuit comprising a switching converter system according to the first aspect or a system according to the second aspect.

According to a fourth aspect the invention provides a host device comprising a switching converter system according to the first aspect or a system according to the second aspect.

The host device may comprise a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the invention will now be described, strictly by way of example only, with reference to the accompanying drawings, of which.

DETAILED DESCRIPTION

An alternative approach to sensing or monitoring such a current through a circuit element is to generate a replica of a current through a switching element (e.g. a MOSFET device) that controls the current through the circuit element of interest, using one or more replica devices. The replica devices are typically smaller versions of the switching element that present a larger on-resistance than the switching element, such that the replica current that flows through the replica devices is a reduced-scale replica of the current through the switch. The replica current can be converted to a voltage using suitable current to voltage converter circuitry, and this voltage can be used to indicate the current through the circuit element of interest.

Figure 1:
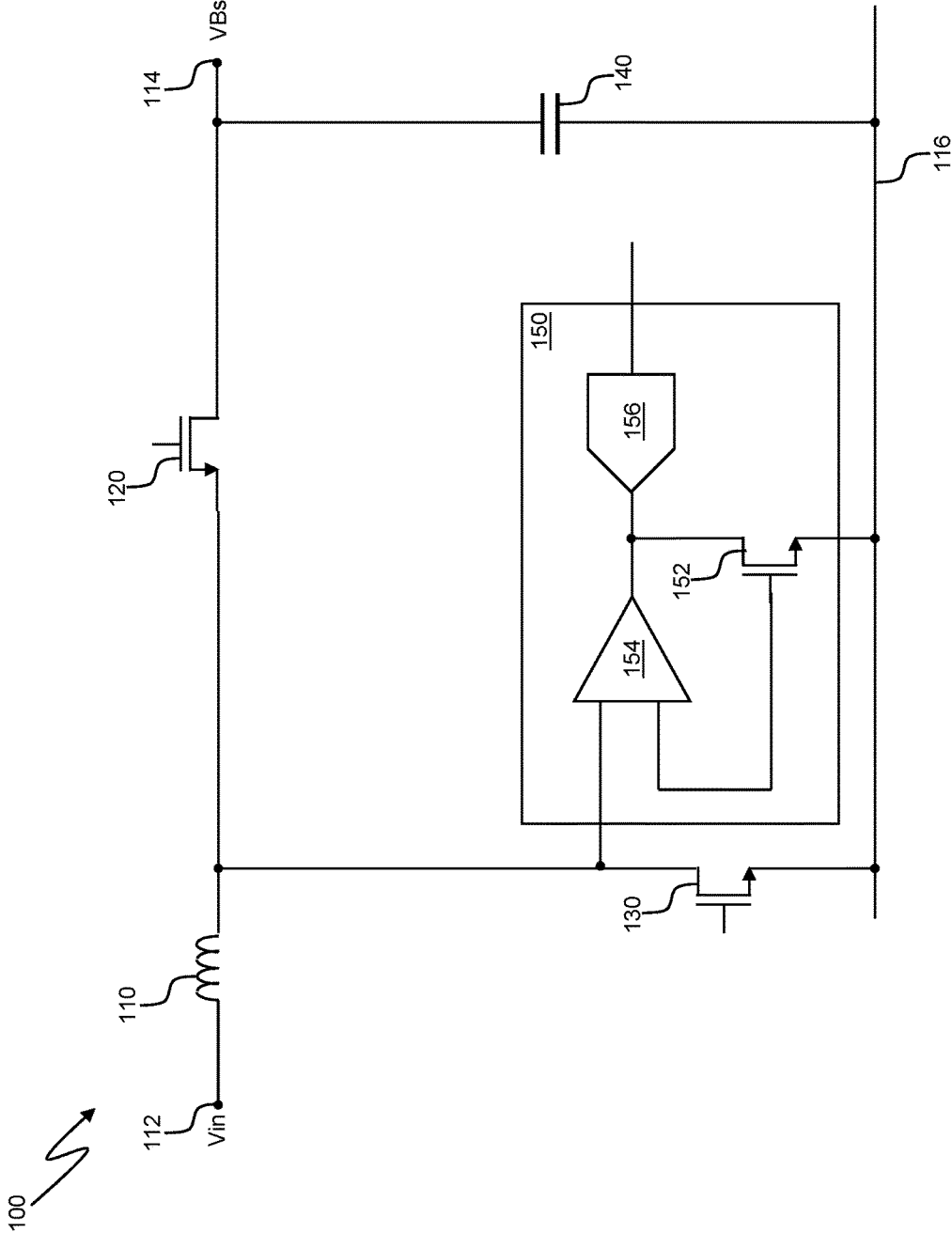
FIG. 1 is a simplified schematic representation of an inductive boost converter circuit that includes current monitoring circuitry that generates a replica current.

FIG. 1 is a simplified schematic representation of an inductive boost converter circuit that includes current monitoring circuitry that generates a replica current.

The inductive boost converter circuit, shown generally at 100 in FIG. 1, comprises an inductor 110, a high-side switch 120, a low-side switch 130 and an output capacitor 140. The high-side switch 120 and the low-side switch 130 may be, for example, MOSFET devices.

The inductive boost converter circuit 100 further includes current monitoring circuitry 150, comprising a replica device 152, an amplifier 154 and an analog to digital converter (ADC) 156 which together comprise a current sensing path.

A first terminal of the inductor 110 is coupled to an input voltage node 112 at which, in use of the inductive boost converter circuit 100, an input voltage Vin is received. The high-side switch 120 is coupled in series between a second terminal of the inductor and an output voltage node 114 at which, in use of the inductive boost converter 100, an output voltage VBst is output. The low-side switch 130 is coupled in series between the second terminal of the inductor 110 and a ground (or other suitable reference voltage) supply rail 116. The output capacitor 140 is coupled between the output voltage node 114 and the ground supply rail 116.

In operation of the boost converter circuit 100, during a first (charging) phase of operation, the low-side switch 130 is closed (switched on) and the high-side switch 120 is open (switched off) in response to suitable control signals output by controller circuitry (not shown in FIG. 1), such that the inductor 110 is coupled between the input voltage node 112 and the ground supply rail 116. In this first phase of operation, an increasing current flows through the inductor 110 and energy is stored in the inductor 110.

In a second (discharging) phase of operation, the low side switch 130 is opened (switched off) and the high-side switch 120 is closed (switched on), such that the second terminal of the inductor 110 is coupled to the output voltage node 114. Current can thus flow from the inductor 110 to the output capacitor 140 and to a load that may be coupled to the output voltage node 114.

The replica device 152 of the current monitoring circuitry 150 is a physically smaller device of the same type (e.g. a MOSFET device) as the low-side switch 130. When the low-side switch 130 is closed, a reduced-scale replica of the current that flows through the low-side switch 130 flows through the replica device 152. This reduced-scale replica current is converted into an analog amplifier output voltage by the amplifier 154, and this analog amplifier output voltage is converted into a digital signal indicative of the replica current (and thus of the current through the low-side switch 130) by the ADC 156.

Replica current monitoring circuitry of the kind described above with reference to FIG. 1 can be more efficient than current monitoring circuitry that uses an in-line current sense resistor, because no power is dissipated as heat by a current sense resistor.

Replica current monitoring circuitry can suffer from gain errors, which may arise, for example, from the effects of different ageing of the replica device(s) (e.g. the replica device 152 in the example shown in FIG. 1) and the circuit element of interest (e.g. the low-side switch 130) or different electrical and/or mechanical stresses on the replica device(s) and the circuit element of interest. Such gain errors can lead to inaccuracy in the current measurements.

For example, in the inductive boost converter circuit 100 of FIG. 1, the low-side switch 130 is physically larger than the replica device 152. The size of the low-side switch 130 limits where it can be positioned in an integrated circuit (IC) implementation of the inductive boost converter circuit 100, such that the low-side switch may have to be positioned in the vicinity of contact balls of the IC. As the replica device 152 is physically smaller than the low-side switch, there are fewer limitations as to the positioning of the replica device 152 in an IC, such that the replica device 152 can be positioned away from the contact balls. Mechanically-induced electrical stress (MIES) during packaging and soldering of the IC thus affects the low-side switch 130 differently than the replica device 152. The MIES and subsequent trimming of the low-side switch 130 and the replica device 152 during production test can lead to part-to-part variations in the ratio of the impedance of the low-side switch 130 to that of the high-side switch. Such variations in the ratio can lead to reduced accuracy in current measurements.

Additionally, the replica device 152 ages differently than the low-side switch 130. In operation of the inductive boost converter circuit 100 the low-side switch 130 is typically switched on and off by a high-frequency pulse width modulated (PWM) control signal, and a non-overlap period in which the low-side switch 130 is switched off occurs between every on-period of the low-side switch 130. The effect of this is that the low-side switch 130 operates in its saturation region for very short periods of time, which causes electrical stress on the low-side switch 130 arising, for example, from effects such as Hot Carrier Injection (HCI) and Bias Temperature Instability (NBTI, PBOT), which increases the rate of ageing of the low-side switch 130. In contrast, the replica device 152 is typically maintained in a switched-on state in operation of the inductive boost converter circuit 100, to maximise the speed with which the current can be sensed, and thus the replica device 152 typically ages at a slower rate than the low-side switch 130. These different rates of ageing can also cause variations in the ratio of the impedance of the low-side switch 130 to that of the high-side switch, again leading to reduced accuracy in current measurements.

Typically a calibration operation may be performed to calibrate out errors arising from MIES, component ageing and the like. In such a calibration operation a known reference signal, e.g. a reference current or voltage, is applied to a circuit and the circuit's response is measured. Parameters of circuit elements (e.g. a gain of an amplifier) are then adjusted to bring the circuit's response to the known reference signal into conformity with an expected response of the circuit to the reference signal.

However, for an inductive boost converter circuit of the kind described above with reference to FIG. 1, it may be difficult to perform such a calibration operation in the field, as it may not be possible to decouple the inductor 110 from the rest of the circuit. This makes it difficult to apply a known reference signal to the circuit.

The present disclosure provides a system and method for calibrating a first switching converter circuit in a multi-phase or multi-converter system using a second switching converter of the system to supply a reference signal, to compensate for an offset in the first switching converter.

Figure 2:
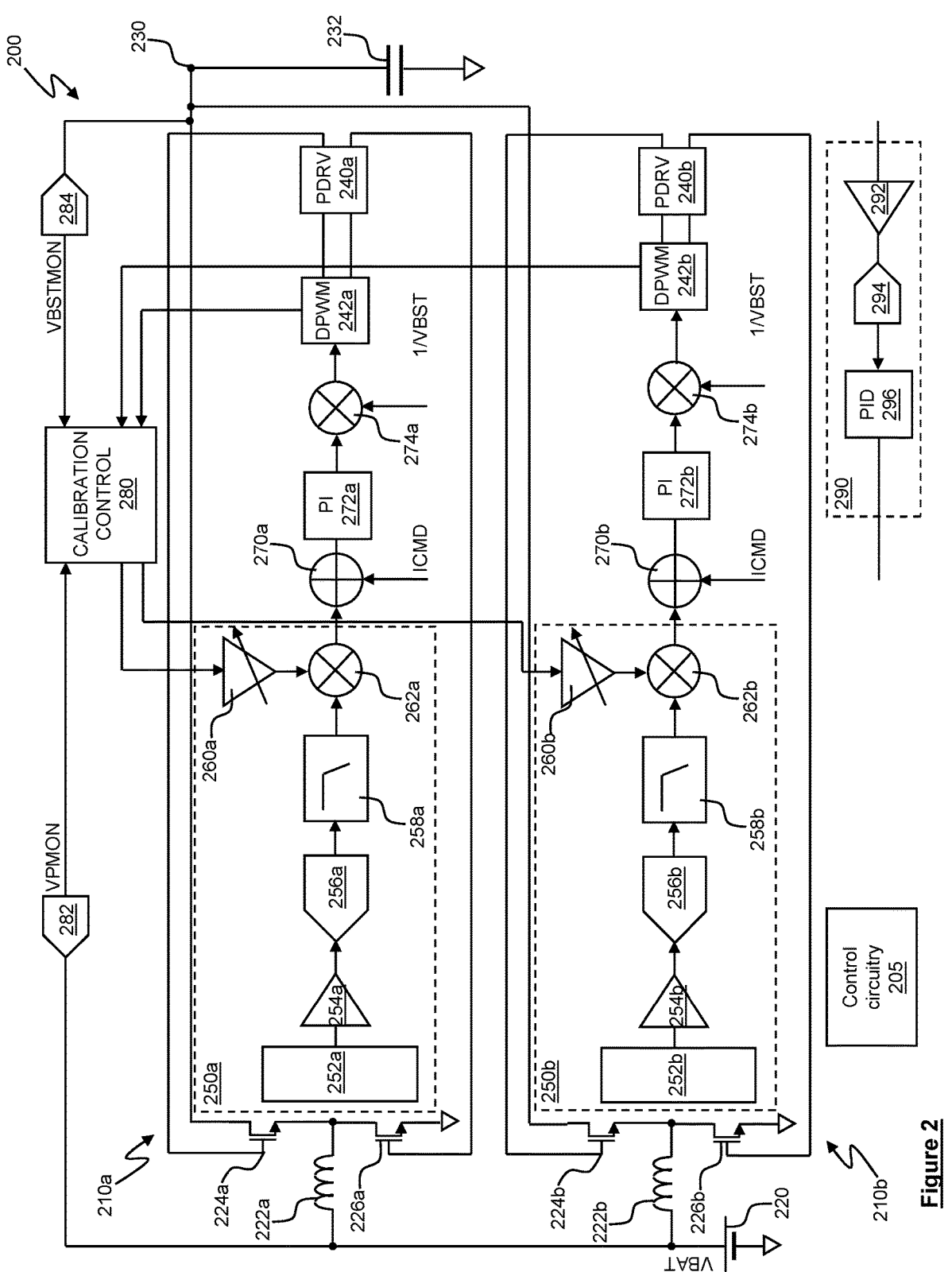
FIG. 2 is a schematic representation of a multi-phase switching power converter implementing a system according to the present disclosure.

FIG. 2 is a schematic representation of a multi-phase switching power converter implementing a system according to the present disclosure.

The multi-phase switching power converter shown generally at 200 in FIG. 2 includes a first switching power converter phase 210*a* and a second switching power converter phase 210*b*. The second switching power converter phase 210*b* is identical in construction and operation to the first switching power converter phase 210*a*. The following description of the first switching power converter phase 210*a* thus also applies to the second switching power converter phase 210*b*. For clarity, elements of the first switching power converter phase 210*a* are denoted in FIG. 2 by a reference numeral with the suffix "a", and corresponding elements of the second switching power converter phase 210*b* are denoted by the same reference numeral with the suffix "b".

In use of the multi-phase switching power converter 200, the first and second switching power converter phases 210*a*, 210*b* each receive a supply voltage VBAT from a power supply 220, which may be, for example, a battery.

The first switching power converter phase 210*a* includes an inductor 222*a* having a first terminal which is coupled, in use of the multi-phase switching power converter 200, to the power supply 220 to receive the supply voltage VBAT.

A high-side switch 224*a* (which may be, for example, a MOSFET device) is coupled between a second terminal of the inductor 222*a* and an output node 230 of multi-phase switching power converter phase 200 (which is common to the first and second power converter phases 210*a*, 210*b*), such that when the high-side switch is closed (switched on), the second terminal of the inductor 222*a* is coupled to the output node 230. An output capacitor 232 is coupled between the output node 230 and a ground (or other reference voltage) supply.

A low-side switch 226*a* (which may be, for example, a MOSFET device) is coupled between the second terminal of the inductor 222*a* and the ground (other reference voltage) supply such that when the low-side switch 226*a* is closed (switched on), the inductor 222*a* is coupled between the power supply 220 and the ground supply to cause a current to flow through the inductor 222*a*, storing energy in the inductor 222*a*.

Operation of the high-side switch 224*a* and the low-side switch 226*a* is controlled by pre-driver circuitry 240*a*, which outputs control signals to the high-side switch 224*a* and the low-side switch 226*a* cause them to open and close as appropriate to achieve a predefined target output voltage (or output voltage range) at the output node 230. An operational cycle of the first switching power converter phase 210*a* includes a first, charging, stage in which suitable control signals are output by the pre-driver circuitry 240*a* to close (switch on) the low-side switch 226*a* and open (switch off) the high-side switch 224*a* to store energy in the inductor 222*a* and a second, discharging, stage in which are output by the pre-driver circuitry 240*a* close (switch on) the high-side switch 224*a* and open (switch off) the low-side switch 226*a* to allow current to flow from the inductor 222*a* to the output node 230 and to any load that may be connected to the output node 230.

The pre-driver circuitry 240*a* in turn receives pulse width modulated (PWM) control signals from digital pulse width modulator (DPWM) circuitry 242*a*, and generates the control signals for the high-side switch 224*a* and the low-side switch 226*a* based on the PWM control signals.

The first switching power converter phase 210*a* further includes a current sense path 250*a* comprising, in this example, one or more replica devices 252*a*, an amplifier 254*a*, an analog to digital converter (ADC) 256*a*, a low-pass filter 258*a*, a controllable digital gain stage 260*a* and a first digital multiplier 262*a*.

The one or more replica devices 252*a* are coupled to the high-side switch 224*a* and/or the low-side switch 226*a* and the amplifier 254*a* (e.g. as described above with reference to FIG. 1) so as to generate a reduced-scale replica of the current through the relevant switch 224*a*, 226*a* and the inductor 222*a* in operation of the first switching power converter phase 210*a*. The replica current is converted into an analog voltage by the amplifier 254*a*. The analog voltage is output by the amplifier 254*a* to the ADC 256*a*, which converts the analog voltage to a digital signal or code indicative of a sensed current through the relevant switch 224*a*, 226*a* and the inductor 222*a* during operation of the first switching power converter phase 210*a*.

As will be appreciated by those of ordinary skill in the art, if a replica device is coupled only to the low-side switch 226*a*, only the current through the low-side switch 226*a* and the inductor 222*a* in the first stage of an operational cycle of the first switching power converter phase 210*a* can be sensed or monitored, whereas if respective replica devices are coupled to both the high-side switch 224*a* and the low-side switch 226*a*, the current through the low-side switch 226*a*, the high-side switch 224*a* and the inductor 222*a* in both the first stage and the second stage of an operational cycle can be sensed or monitored.

The controllable digital gain stage 260*a* is operable to apply a controllable digital gain G1 to the filtered digital signal output by the digital low-pass filter 258*a*, via the first digital multiplier 262*a*. The controllable digital gain G1 is selected during a calibration operation to compensate for part-to-part variations in parameters of the circuit elements of the first power converter phase 210*a*, e.g. variations in the impedance of the high-side switch 224*a*, the low-side switch 226*a* or the replica device(s) 252*a*, or variations in a gain of the amplifier 254*a* or the digital low-pass filter 258*a*.

The first switching power converter phase 210*a* further includes a control loop including, in the illustrated example a digital subtractor 270*a*, a proportional-integral (PI) controller 272*a* and a second digital multiplier 274*a*. It will be appreciated by those of ordinary skill in the art that other types of controller could equally be used. For example, a proportional-integral-derivative (PID) controller, a type II controller or the like may be used in place of the PI controller 272*a*.

A first input of the digital subtractor 270*a* is coupled to an output of the first digital multiplier 262*a* to receive a gain-adjusted digital signal indicative of the sensed current through the inductor 222*a* during operation of the first switching power converter phase 210*a*. A second input of the digital subtractor 270*a* receives a digital signal ICMD indicative of a predefined target current through the inductor 222*a*. The digital subtractor 270*a* is configured to output a digital subtractor output signal indicative of a difference between the sensed current through the inductor 222*a* and the predefined target current through the inductor 222*a* to the PI controller 272*a*.

The PI controller 272*a* is operative to generate a PI control signal based on the digital subtractor output signal, with the aim of minimising the difference between the sensed current through the inductor 222*a* and the predefined target current through the inductor 222*a*.

The PI control signal is output by the PI controller 272*a* to a first input of the second digital multiplier 274*a*. A second input of the second digital multiplier 274*a* receives a digital signal 1/VBST indicative of a value of a reciprocal of a predefined target output voltage for the first power converter phase 210*a*. The second digital multiplier 274*a* is thus operative to modify the PI control signal output by the PI controller 272*a* by dividing it by the target output voltage. The second digital multiplier 274*a* outputs this modified PI control signal to the digital PWM modulator 242*a*, which generates the PWM control signals that are used by the pre-driver circuitry 240*a* to generate control signals for the high-side and low-side switches 224*a*, 226*a* to regulate the current through the inductor 222*a* and the output voltage of the first switching power converter phase 210*a* in accordance with the predefined target inductor current and the predefined output voltage.

The multi-phase switching power converter 200 further includes calibration controller circuitry 280. The calibration controller circuitry 280 may comprise a suitably configured microprocessor, microcontroller, state machine, application specific integrated circuit (ASIC), field programmable gate array (FPGA) or the like, or may comprise discrete circuitry or integrated circuitry configured to perform the operations described below.

A first input of the calibration controller circuitry 280 is coupled to an output of a supply voltage monitor ADC 282. An input of the supply voltage monitor ADC 282 is coupled, in use of the multi-phase switching power converter 200, to the power supply 220. The supply voltage monitor ADC 282 is thus configured to generate and output a digital signal VPMON indicative of the supply voltage VBAT.

A second input of the calibration controller circuitry 280 is coupled to an output of an output voltage monitor ADC 284. An input of the output voltage monitor ADC 284 is coupled, in use of the multi-phase switching power converter 200, to the output node 230 of the first switching power converter phase 210*a*. The output voltage monitor ADC 284 is thus configured to generate and output a digital signal VBSTMON indicative of the output voltage of the first power converter phase 210*a*.

The calibration controller circuitry 280 has further inputs that are coupled, in use of the multi-phase switching power converter 200, to outputs of the DPWM modulators 242*a*, 242*b* of the first and second switching power converter phases 210*a*, 210*b* respectively.

A first output of the calibration controller circuitry 280 is coupled to an input of the controllable digital gain stage 260*a* of the first switching power converter phase 210*a*. A second output of the calibration controller circuitry 280 is coupled to an input of the controllable digital gain stage 260*b* of the second switching power converter phase 210*b*.

The multi-phase switching power converter 200 further includes a calibration control path 290 comprising a calibration control path amplifier 292, a calibration control path ADC 294 and a calibration control path PID controller 296.

The multi-phase switching power converter 200 may be implemented as an integrated circuit (IC). In some examples the inductors 222a, 222b may be integrated in the IC (i.e. the inductors 222a, 222b may be on-chip devices). In other examples the inductors 222a, 222b may be separate from the IC (i.e. the inductors 222a, 222b may be on-chip devices).

Alternatively, the multi-phase switching power converter 200 may be implemented as a plurality of ICs, e.g. a first IC comprising the first switching power converter phase 210a (with the inductor 222a being either an on-chip device or an off-chip device) and a second IC comprising the second switching power converter phase 210b (with the inductor 222b being either an on-chip device or an off-chip device).

As a further alternative, the multi-phase switching power converter 200 may be implemented in discrete circuitry.

A production calibration operation may be performed in a production test environment after manufacture of the multi-phase switching power converter 200 (e.g. after fabrication of an IC implementing the multi-phase switching power converter 200) to determine the gain of the current sense paths of each switching power converter phase 210a, 210b. In the event that the gain of one or both of the current sense paths 250a, 250b, as determined by the production calibration operation, does not correspond to a predefined expected gain for that current sense path, a correction gain can be applied by the controllable digital gain stage 260a, 260b of the relevant current sense path.

The production calibration operation is described below with reference to the first switching power converter phase 210a. It will be appreciated that the same production calibration operation can be performed for the second switching power converter phase 210b.

In the production calibration operation, a first known reference current (e.g. 1A) is passed through the low-side switch 226a and the output of the ADC 256a is measured. The first known reference current is also passed through the high-side switch 224a and the output of the ADC 256a is measured. A second known reference current (e.g. 2A) is passed through the low-side switch 226a and the output of the ADC 256a is again measured. The second known reference current is also passed through the high-side switch 224a and the output of the ADC 256a is measured.

From the measurements of the output of the ADC 256a a low-side gain G_LS1 and a high-side gain G_HS1 of the current sense path of the first switching power converter phase 210a are calculated (e.g. by the calibration controller circuitry 280 or by external processing circuitry of automated test equipment performing the production calibration operation). An overall gain G1 of the current sense path can also be calculated (e.g. by the calibration controller circuitry 280 or by external processing circuitry of the automated test equipment) using the relationship G1=G_HS1*(1−D)+G_LS1*D, where D is the duty cycle of a PWM control signal output by the DPWM modulator 242a.

The low-side gain G_LS2, high-side gain G_HS2 and overall gain G2 of the current sense path of the second switching power converter phase 210b are also determined in a similar manner.

The measured outputs of the ADC 256a for the first known reference current are stored, e.g. in a one-time programmable (OTP) memory element of the multi-phase switching power converter 200, for subsequent use as a reference, e.g. to determine a change to one or more parameters of the first switching power converter phase 210a that may arise due to ageing or degradation of one or more of the components of the first switching power converter phase 210a.

The multi-phase switching power converter 200 is operable in a first, power conversion, mode, in which operation of the first and second switching power converter phases 210a, 210b is controlled by suitable control circuitry 205 (which may comprise, for example, discrete circuitry, integrated circuitry such as a microprocessor or microcontroller executing appropriate software commands, or an application specific integrated circuit or ASIC) such that an output voltage comprising a first output voltage component output by the first switching power converter phase 210a and a second output voltage component output by the second switching power converter phase 210b. Such an output voltage may be referred to as a multi-phase output voltage, as it includes components from multiple switching converter phases.

The multi-phase switching power converter 200 is also operable in a second, calibration, mode for performing a field calibration operation, as will now be described with reference to FIG. 3.

Figure 3:
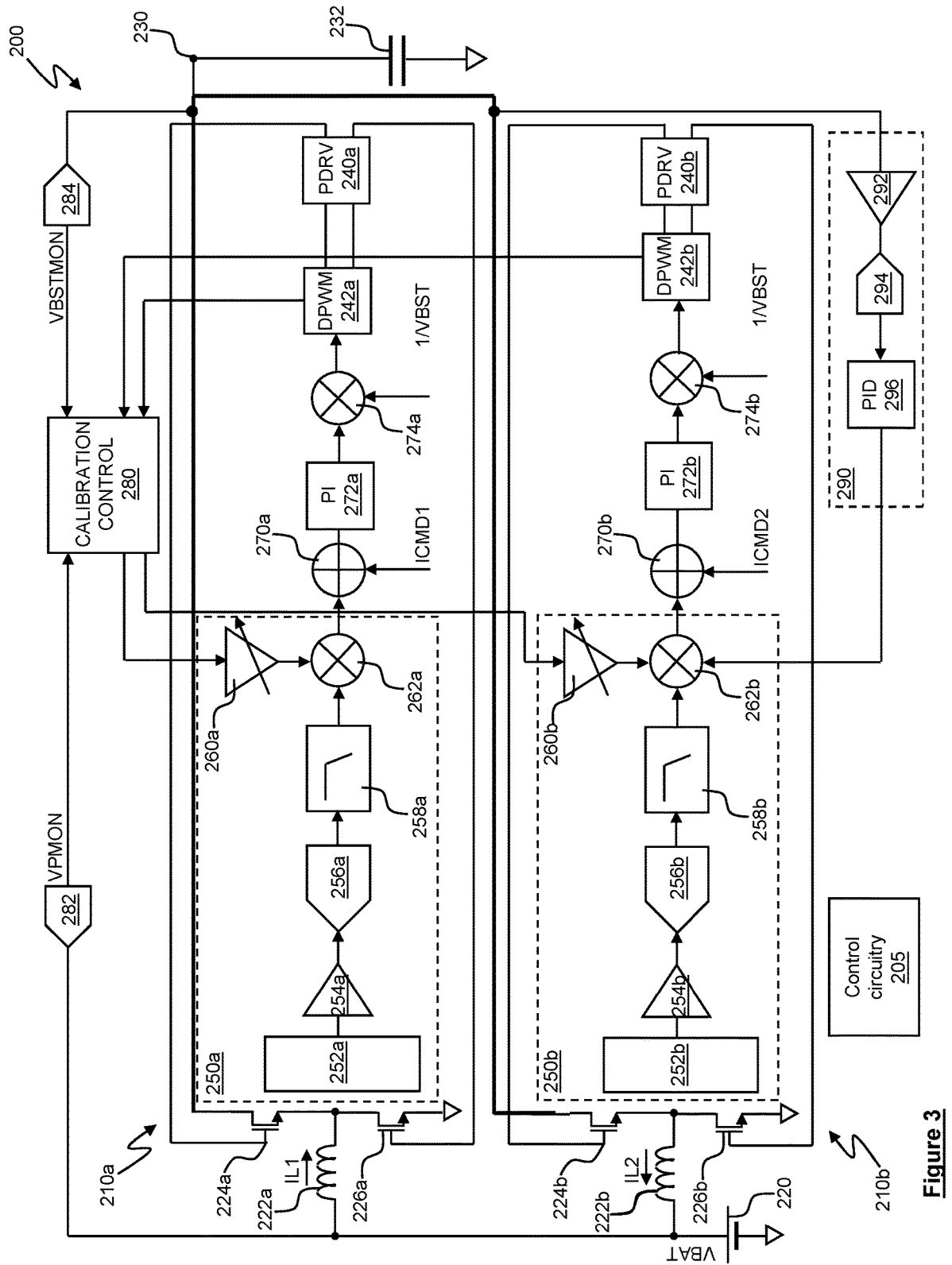
FIG. 3 is a schematic representation of a configuration of the multi-phase switching power converter of FIG. 2 for performing a field calibration operation.

FIG. 3 shows a configuration of the multi-phase switching power converter 200 for use in a field calibration operation. In the example shown in FIG. 3, the first switching power converter phase 210a acts as a current source and the second switching power converter phase 210b acts as a current sink during the field calibration operation to cause a flow of current between the first and second switching power converter phases 210a, 210b to enable one or more characteristics of the first and second switching power converter phases 210a, 210b to be detected or determined. It will be appreciated, however, that the second switching power converter phase 210b could equally act as a current source and the first switching power converter phase 210a could act as a current sink.

The field calibration operation may be performed, for example, on power up or power-on reset of the multi-phase switching power converter 200, and/or in dedicated maintenance or calibration mode in which the first and second phases 210a, 210b are calibrated.

As shown in FIG. 3, in use of the multi-phase switching power converter 200 for the field calibration operation, the output voltage of the first switching power converter phase 210a is supplied to the high-side switch 224b of the second switching power converter phase 210b. Thus, in operation of the multi-phase switching power converter 200 in the second, calibration, mode, the first switching power converter phase 210a acts as a reference supply for the second switching power converter phase 210b.

An input of the output voltage monitor ADC 284 is coupled to the output node 230, such that the output voltage monitor ADC 284 generates and outputs a digital signal VBSTMON indicative of the output voltage of the first switching power converter phase 210a to the calibration controller circuitry 280.

An input of the calibration control path amplifier 292 is also coupled to the output node 230. An output of the calibration control path amplifier 292 is coupled to an input of the calibration control path ADC 294. The calibration control path ADC 294 thus generates and outputs a digital signal indicative of the output voltage of the first power converter phase 210a. An output of the calibration control path ADC 294 is coupled to an input of the calibration control path PID controller 296. An output of the calibration control path PID controller 296 is coupled to a third input of the first digital multiplier 262b of the second switching power converter phase 210b. In some examples the output voltage monitor ADC 284 and the calibration control path ADC 294 may be implemented by the same ADC. For example, in some implementations in which the first and second switching power converter phases 210a, 210b are implemented in a single IC, the output voltage monitor ADC 284 and the calibration control path ADC 294 may be implemented by the same ADC.

The first switching power converter phase 210a is operated (e.g. in response to suitable control signals output by the control circuitry 205) in a voltage regulation mode to regulate the output voltage at the output node 230 at a target output voltage (e.g. 12V). In this mode of operation, the PWM signals output by the DWPM modulator 242a and the target current digital signal ICMD1 can be adjusted by the control loop of the first switching power converter phase 210a to meet the target output voltage.

The current IL1 through the inductor 222a of the first switching power converter phase 210a during the field calibration operation is defined by the relationship:

$$IL1 = ICMD1 * G1, \tag{1}$$

where G1 is the (unknown) gain of the current sense path of the first power converter phase 210a.

A digital signal of value ICMD2 corresponding to a predefined known negative target current value (e.g. −1 A) through the inductor 222b of the second switching power converter phase 210b is input (e.g. by the control circuitry 205) to the second input of the digital subtractor 270b of the second power converter phase 210b. The second switching power converter phase 210b thus acts as a current sink during the field calibration operation.

The current through the inductor 222b of the second switching power converter phase 210b during the field calibration operation is defined by the relationship:

$$IL2 = ICMD2 * G2, \tag{1}$$

where G2 is the (unknown) gain of the current sense path of the second switching converter phase 210b.

Once the output voltage at the output node 230 has settled (which may be determined, for example, by the calibration controller circuitry 280 comparing the digital signal VBST-MON to a digital signal indicative of the target output voltage), a steady state has been achieved by the first switching power converter phase 210a acting as a current source and the second switching power converter phase 210b acting as a current sink. The calibration controller circuitry 280 then measures and stores a value ICMD1 of the target current signal ICMD for the first switching power converter phase 210a and a value ICMD2 of the target current signal ICMD for the second switching power converter phase 210b.

The calibration controller circuitry 280 then adjusts the gain G1 of the current sense path of the first switching power converter phase 210a by a predetermined value ΔG (which may be positive or negative), such that the gain of the current sense path is G1+ΔG. This has the effect of changing the current through the inductor 222a, and thus also changing the gain-adjusted digital signal indicative of the sensed current through the inductor 222a output by the first digital multiplier 262a to the digital subtractor 270a. As a result, the digital subtractor output signal output by the digital subtractor 270a changes. This change in the digital subtractor output signal causes the control loop of the first switching power converter phase 210a to adjust the duty cycle of the PWM signals output by the DWPM modulator 242a and the value of the target current signal ICMD1 to continue to meet the target output voltage.

Once the output voltage at the output node 230 has again settled at the target output voltage, the adjusted value ICMD1' of the target current signal ICMD1 for the first switching power converter phase 210a is measured and stored by the calibration controller circuitry 280.

As the value of the target current signal ICMD1 for the first switching power converter phase 210a has been adjusted, a corresponding adjustment is required to the value of the target current signal ICMD2 for the second switching power converter phase 210b to ensure that the second switching power converter phase 210b is able to sink the current output by the first switching power converter phase 210a, which also gives rise to a change in the duty cycle of the second switching power converter phase 210b. The adjusted value ICMD2' of the value ICMD2 of the target current signal ICMD for the second switching power converter phase 210b is measured and stored by the calibration controller circuitry 280.

Thus, in operation of the switching power converter 200 in the second, calibration, mode, an adjustment or offset is applied to the duty cycles of the first and second switching converter phases 210a, 210b.

Defining the supply voltage provided by the power supply as VBAT and the output voltage of the first switching power converter phase 210a as VBST, it can be shown that:

$$VBAT * IL1 * \eta 1 = VBST * iload1; \text{ and} \tag{3}$$

$$VBAT * IL2 * \eta 2 = VBST * iload2, \tag{4}$$

where $\eta 1$ is the efficiency of the first switching power converter phase 210a, $\eta 1$ is the efficiency of the second switching power converter phase 210b, iload1 is the load current of the first switching power converter phase 210a and iload2 is the load current of the second switching power converter phase 210a.

If iload1=iload2, then:

$$VBAT * IL1 * \eta 1 = VBAT * IL2 * \eta 2 \tag{5}$$

The efficiency $\eta$ of a switching power converter can be expressed as:

$$\eta = (1-D) * VBAT/VBST, \tag{6}$$

where D is the duty cycle of the switching power converter.

A ratio of the efficiency $\eta 1$ of the first switching power converter phase 210a to the efficiency $\eta 2$ of the second switching power converter phase 210b can be defined as:

$$\eta 1/\eta 2 = (1-D1)/(1-D2), \tag{7}$$

where D1 is the duty cycle of the first switching power converter phase 210a
and D2 is the duty cycle of the second switching power converter phase 210b.

As noted above, IL1=ICMD1*G1 and IL2=ICMD2*G2. From relationships (1), (2), (5) and (7) above it can be shown that:

$$G1/G2 = (ICMD2/ICMD1) * (1-D2)/(1-D1) \tag{8}$$

Similarly:

$$(G1+\Delta G)/G2 = (ICMD2'/ICMD1') * (1-D2')/(1-D1'), \tag{9}$$

where D1' and D2' are duty cycles of the first and second switching power converter phases, respectively, when the gain adjustment ΔG is applied.

Relationships (8) and (9) above are two linear equations for two unknowns (G1 and G2). The calibration controller circuitry 280 can thus solve these equations to determine G1 and G2:

$$G1 = K1 * G2, \text{ and} \tag{10}$$

$$G1 + \Delta G = K1' * G2. \tag{11}$$

13

From equations (10) and (11) above, it can be shown that:

$$G2=\Delta G/(K1'-K1), \text{ and} \qquad (12)$$

$$G1=K1*\Delta G/(K1'-K1), \qquad (13)$$

where $K1=(ICMD2/ICMD1)*(1-D2)/(1-D1)$, and $$K1'=(ICMD2'/ICMD1')*(1-D2')/(1-D1').$$

The calibration controller circuitry 280 calculates the gains G1 and G2 of the current sense paths of the first and second switching converter phases 210a, 210b respectively, based on equations (12) and (13) above.

In the absence of any gain errors in a current sense path (which, as explained above, may arise, for example, from the effects of ageing of the replica device(s) of the current sense paths or MIES), the gain of the current sense path should be equal to a predefined gain, which may be, for example, unity (i.e. 1 or 0 dB).

If the gain of a current sense path 250a, 250b, as calculated by the calibration controller circuitry 280 is not equal to the predefined gain, then there is a gain error in that current sense path.

In response to a determination, by the calibration controller circuitry 280, that the calculated gain of a current sense path 250a, 250b does not correspond to the predefined gain for that current sense path 250a, 250b, the calibration controller circuitry 280 supplies a suitable control signal to the digital gain stage 260a, 260b of the affected current sense path 250a, 250b to cause that digital gain stage 260a, 260b to apply a correction gain to the relevant current sense path 250a, 250b to force the gain of the affected current sense path 250a, 250b to be equal to the predefined gain.

In this way the field calibration operation can be performed to correct any gain error in the current sense paths 250a, 250b without disconnecting the inductors 222a, 222b and without an external reference current.

The method described above can be extended to perform a field calibration operation for more than two switching power converter phases.

For example, first and second switching power converter phases may be configured to act as current sources, and third and fourth switching power converter phases may be configured to act as current sinks. In such an arrangement:

$$IL1+IL2=IL3=IL4,$$

where IL1 is the current through the inductor of the first switching power converter phase, IL2 is the current through the inductor of the second switching power converter phase, IL3 is the current through the inductor of the third switching power converter phase and IL4 is the current through the inductor of the fourth switching power converter phase.

Predefined gain adjustments ΔG1, ΔG2 and ΔG3 are applied to the current sense path of the first switching power converter phase, and the resulting target current values for the four switching power converter phases are measured by the calibration controller circuitry 280 to generate a system of four equations for four unknowns:

$$G1*ICMD1+G2*ICMD2=G3*ICMD3+G4*ICMD4$$

$$(G1+\Delta G1)ICMD1=G2*ICMD2'=G3*ICMD3'+G4*ICMD4'$$

$$(G1+\Delta G2)ICMD1=G2*ICMD2''=G3*ICMD3''+G4*ICMD4''$$

$$(G1+\Delta G3)ICMD1=G2*ICMD2'''=G3*ICMD3'''+G4*ICMD4''$$

14

(Note that in the system of equations above scale factors $(1-D2)/(1-D1)$ are omitted for simplicity. Those of ordinary skill in the art will appreciate that in a practical implementation such scale factors will be included in the system of equations).

The calibration controller circuitry 280 can then solve these equations for G1, G2, G3, and G4 to determine the gains of the current sense paths of the first, second, third and fourth switching power converter phases respectively, and can apply a correction gain to any current sense path where a gain error exists (i.e. any current sense path for which the calculated gain does not correspond to a predefined gain) as described above.

In examples where separate switching power converter phases are provided on separate ICs, primary current controller circuitry (which may be provided on one of the ICs, or may be separate from the ICs) may calculate the gains of the current sense paths as described above, and may transmit suitable control signals or instructions to the switching power converter phases on the separate ICs to apply any correction gain that may be required.

Although the description above relates to a multi-phase inductive boost converter, it will be appreciated that the system and method described above are equally applicable to other types of inductive power converter such as inductive buck converters and inductive buck-boost converters.

The example switching power converter 200 described above with reference to FIGS. 2 and 3 includes replica current sense paths for sensing the current through the inductors 226a, 226b. However, it will be appreciated that alternative current sensing arrangements could equally be employed, e.g. using a current sense resistors coupled in series with the circuit element (e.g. inductor) of interest as described above, and suitable amplifier and/or signal processing circuitry for amplifying and/or processing the detected voltage across the current sense resistor to generate a signal indicative of the current through the circuit element of interest.

As will be appreciated by those of ordinary skill in the art, such alternative current sensing arrangements can also suffer from gain errors arising from, e.g. part to part variations in components, ageing and MIES.

The field calibration operation described above is equally applicable to such alternative current sensing arrangements to correct any gain error in current sense paths that include such alternative current sensing arrangements, again without disconnecting the inductors 222a, 222b and without an external reference current.

The circuitry described above with reference to the accompanying drawings may be incorporated in a host device such as a laptop, notebook, netbook or tablet computer, a gaming device such as a games console or a controller for a games console, a virtual reality (VR) or augmented reality (AR) device, a mobile telephone, a portable audio player or some other portable device, or may be incorporated in an accessory device for use with a laptop, notebook, netbook or tablet computer, a gaming device, a VR or AR device, a mobile telephone, a portable audio player or other portable device.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A switching converter system comprising a first converter phase and a second converter phase, the switching converter system being operable in:
   a power conversion mode in which the first and second converter phases are operative to generate a multiphase output voltage at an output of the switching converter circuit; and
   a calibration mode in which the first converter phase is operative as a reference supply for the second converter phase to cause a flow of current between the first and second converter phases to enable detection of a characteristic of each of the first and second converter phases;
   wherein the switching converter system further comprises calibration control circuitry, wherein in operation of the switching converter system in the calibration mode, the calibration control circuitry is operative to:
   monitor current values of the first and second converter phases while applying a predefined adjustment to a parameter of the first converter phase; and
   detect the characteristic of each of the first and second converter phases based on the monitored current values and the predefined adjustment,
   wherein in operation of the switching converter system in the calibration mode, an offset is applied to a duty cycle of each of the first and second switching converter phases,
   wherein the offset is applied to the duty cycle of each of the first and second switching converter phases as a result of the application of the predefined adjustment to the parameter of the first converter phase.

2. A switching converter system according to claim 1, wherein in operation of the switching converter system in the calibration mode, the calibration control circuitry is further operative to:
   compare the detected characteristics of the first and second converter phases to respective predefined characteristics for the first and second converter phases; and apply a correction to the detected characteristic of the first and/or second converter phase if the detected characteristic does not correspond to the respective predefined characteristic.

3. A switching converter system according to claim 1, wherein the current values of the first and second converter phases comprise target current values of the first and second converter phases.

4. A switching converter system according to claim 1, wherein applying the predefined adjustment to the parameter of the first converter phase comprises applying a predefined gain adjustment to the first converter phase.

5. A switching converter system according to claim 1, wherein:

the first converter phase comprises a first current sense path;

the second converter phase comprises a second current sense path; and applying the predefined adjustment to the parameter of the first converter phase comprises applying a predefined gain adjustment to the first current sense path.

6. A switching converter system according to claim 2, wherein:

the first converter phase comprises a first current sense path;

the second converter phase comprises a second current sense path; and applying a correction to the detected characteristic of the first and/or second converter phase if the detected characteristic does not correspond to the respective predefined characteristic comprises applying a correction gain to the first and/or second current sense path.

7. A switching converter system according to claim 6, wherein the first current sense path comprises a first replica current sense path and the second current sense path comprises a second replica current sense path.

8. A switching converter system according to claim 6, wherein the first replica current sense path comprises:

a replica device coupled to a switch of the first converter phase and configured to output a replica current indicative of a current through the switch;

an amplifier for converting the replica current into a voltage; and a controllable gain stage for applying the correction gain; and wherein the second replica current sense path comprises:

a replica device coupled to a switch of the second converter phase and configured to output a replica current indicative of a current through the switch;

an amplifier for converting the replica current into a voltage; and a controllable gain stage for applying the correction gain.

9. A switching converter system according to claim 3, wherein:

the first converter phase comprises a first control loop operative to generate the target current value of the first converter phase; and the second converter phase comprises a second control loop operative to generate the target current value of the second converter phase.

10. A switching converter system according to claim 9, wherein the first and second control loops each comprise:

a subtractor for generating a difference signal indicative of a difference between a sensed current through a switch of the respective first or second converter phase and a target current for the respective converter phase;

a proportional-integral (PI) controller for generating a proportional-integral (PI) control signal phase on the difference signal;

a multiplier for applying a signal indicative of a target output voltage for the respective converter phase to the PI control signal to modify the PI control signal based on the target output voltage.

11. A switching converter system according to claim 10, wherein the first and second converter phases each comprise:

a pulse-width modulator configured to generate a pulse-width modulated (PWM) control signal based on the modified PI control signal; and pre-driver circuitry configured to generate switch control signals for the switch of the respective first or second converter phase based on the PWM control signal.

12. A switching converter system according to claim 1, further comprising output voltage monitor circuitry configured for supplying a signal indicative of an output voltage of the first converter phase to the calibration control circuitry.

13. A switching converter system according to claim 12, wherein the calibration control circuitry is operative to determine when the output voltage of the first converter phase has settled based on the signal indicative of the output voltage of the first converter phase, and to apply the predefined adjustment in response to a determination that the output voltage of the first converter phase has settled.

14. A switching converter system according to claim 1, wherein the first and second converter phases are implemented in an integrated circuit.

15. A switching converter system according to claim 1, wherein the first converter phase is implemented in a first integrated circuit and the second converter phase is implemented in a second integrated circuit.

16. A switching converter system according to claim 1, wherein the first and second converter phases each comprise boost converter circuitry, buck converter circuitry or buck-boost converter circuitry.

17. An integrated circuit comprising a switching converter system according to claim 1.

18. A host device comprising a switching converter system according to claim 1.

19. A host device according to claim 18, wherein the host device comprises a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

20. A system comprising:

first switching power converter circuitry having a first current sense path;

second switching power converter circuitry having a second current sense path; and calibration control circuitry, wherein the system is operable in a calibration mode in which the first switching power converter circuitry is coupled to the second switching power converter circuitry to supply a current to the second switching power converter circuitry, wherein in operation of the system in the calibration mode, the first power converter is operated in a voltage regulation mode to output a target output voltage, and the calibration control circuitry is operative to:

determine a first value of a first target current for the first switching power converter circuitry generated by a control loop of the first switching power converter circuitry;

apply a predefined first value of a second target current for the second switching power converter circuitry to the second switching power converter circuitry;

apply a predetermined gain adjustment to the first current sense path;

determine a second value of the first target current generated by the control loop of the first switching power converter circuitry in response to the gain adjustment;

determine a second value of the second target current generated by a control loop of the second switching power converter circuitry in response to the gain adjustment;

based on the first and second values of the first target current and the first and second values of the second target current, calculate a gain of the first current sense path and a gain of the second current sense path; and responsive to a determination that the calculated gain of the first or second current sense path is not equal to a predefined gain, apply a correction gain to the relevant one of the first or second current sense paths.

21. A switching converter system comprising a first converter phase and a second converter phase, the switching converter system being operable in:

a power conversion mode in which the first and second converter phases are operative to generate a multi-phase output voltage at an output of the switching converter circuit; and a calibration mode in which the first converter phase is operative as a reference supply for the second converter phase to cause a flow of current between the first and second converter phases to enable detection of a characteristic of each of the first and second converter phases, wherein the switching converter system further comprises calibration control circuitry, wherein in operation of the switching converter system in the calibration mode, the calibration control circuitry is operative to:

monitor current values of the first and second converter phases while applying a predefined adjustment to a parameter of the first converter phase; and detect the characteristic of each of the first and second converter phases based on the monitored current values and the predefined adjustment, wherein:

the first converter phase comprises a first current sense path;

the second converter phase comprises a second current sense path; and applying the predefined adjustment to a parameter of the first converter phase comprises applying a predefined gain adjustment to the first current sense path.

22. A switching converter system comprising a first converter phase and a second converter phase, the switching converter system being operable in:

a power conversion mode in which the first and second converter phases are operative to generate a multi-phase output voltage at an output of the switching converter circuit; and a calibration mode in which the first converter phase is operative as a reference supply for the second converter phase to cause a flow of current between the first and second converter phases to enable detection of a characteristic of each of the first and second converter phases, wherein the switching converter system further comprises calibration control circuitry, wherein in operation of the switching converter system in the calibration mode, the calibration control circuitry is operative to:

monitor current values of the first and second converter phases while applying a predefined adjustment to a parameter of the first converter phase; and detect the characteristic of each of the first and second converter phases based on the monitored current values and the predefined adjustment, wherein the switching converter circuitry further comprises output voltage monitor circuitry configured for supplying a signal indicative of an output voltage of the first converter phase to the calibration control circuitry, and wherein the calibration control circuitry is operative to determine when the output voltage of the first converter phase has settled based on the signal indicative of the output voltage of the first converter phase, and to apply the predefined adjustment in response to a determination that the output voltage of the first converter phase has settled.

23. A switching converter system comprising a first converter phase and a second converter phase, the switching converter system being operable in:

a power conversion mode in which the first and second converter phases are operative to generate a multi-phase output voltage at an output of the switching converter circuit; and a calibration mode in which the first converter phase is operative as a reference supply for the second converter phase to cause a flow of current between the first and second converter phases to enable detection of a characteristic of each of the first and second converter phases, wherein the switching converter system further comprises calibration control circuitry, wherein in operation of the switching converter system in the calibration mode, the calibration control circuitry is operative to:

monitor current values of the first and second converter phases while applying a predefined adjustment to a parameter of the first converter phase; and detect the characteristic of each of the first and second converter phases based on the monitored current values and the predefined adjustment, wherein in operation of the switching converter system in the calibration mode, the calibration control circuitry is further operative to:

compare the detected characteristics of the first and second converter phases to respective predefined characteristics for the first and second converter phases; and apply a correction to the detected characteristic of the first and/or second converter phase if the detected characteristic does not correspond to the respective predefined characteristic, wherein:

the first converter phase comprises a first current sense path;

the second converter phase comprises a second current sense path; and applying the correction to the detected characteristic of the first and/or second converter phase if the detected characteristic does not correspond to the respective predefined characteristic comprises applying a correction gain to the first and/or second current sense path.

\* \* \* \* \*